(12) United States Patent
Li et al.

(10) Patent No.: US 10,642,774 B2
(45) Date of Patent: May 5, 2020

(54) CIRCUIT STRUCTURE SHARING THE SAME MEMORY AND DIGITAL VIDEO TRANSFORMING DEVICE

(71) Applicant: ALi Corporation, Hsinchu (TW)

(72) Inventors: Jian-Xin Li, Shanghai (CN); Dong e Yu, Shanghai (CN); Han-jun Li, Shanghai (CN)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 15/985,703

(22) Filed: May 22, 2018

(65) Prior Publication Data
US 2018/0336155 A1 Nov. 22, 2018

(30) Foreign Application Priority Data
May 22, 2017 (CN) .......................... 2017 1 0362469

(51) Int. Cl.
| | |
|---|---|
| H04N 7/01 | (2006.01) |
| G06F 13/40 | (2006.01) |
| H04N 7/04 | (2006.01) |
| G06F 13/16 | (2006.01) |
| H04N 5/38 | (2006.01) |

(52) U.S. Cl.
CPC ...... *G06F 13/4068* (2013.01); *G06F 13/1689* (2013.01); *H04N 7/04* (2013.01); *H04N 5/38* (2013.01); *H04N 7/01* (2013.01)

(58) Field of Classification Search
None
See application file for complete search history.

(56) References Cited

U.S. PATENT DOCUMENTS

| | | | | |
|---|---|---|---|---|
| 7,403,564 B2* | 7/2008 | Laksono | .......... | H04N 21/44026 375/240 |
| 7,613,913 B2* | 11/2009 | Haban | ....................... | G06F 8/60 713/1 |
| 8,838,949 B2* | 9/2014 | Gupta | ................... | G06F 9/4405 712/30 |
| 2003/0229748 A1* | 12/2003 | Brewer | ................. | G06F 13/385 710/305 |
| 2006/0072909 A1* | 4/2006 | Wang | ....................... | H04N 5/85 386/231 |
| 2008/0182520 A1* | 7/2008 | Rofougaran | ............. | H04B 1/38 455/63.1 |
| 2009/0066706 A1* | 3/2009 | Yasue | ....................... | G06T 1/20 345/505 |

(Continued)

*Primary Examiner* — Elias Mamo
(74) *Attorney, Agent, or Firm* — J.C. Patents

(57) ABSTRACT

The invention provides a circuit structure sharing the same memory, where the circuit structure includes a first volatile memory, a system chip and a signal processing chip. The system chip is connected to the first volatile memory via a first connection interface. The signal processing chip is connected to the system chip via a second connection interface. A memory controller is disposed in the system chip and connected to the first connection interface and the second connection interface. The signal processing chip transmits a first access command to the memory controller via the second connection interface, and the memory controller accesses the first volatile memory via the first connection interface according to the first access command and transmits the access result of the first access command to the signal processing chip via the second connection interface.

12 Claims, 6 Drawing Sheets

(56) References Cited

U.S. PATENT DOCUMENTS

2010/0060654 A1* 3/2010 Lin .................. H04N 19/423
                                                  19/423
2016/0378151 A1* 12/2016 Querbach ............ G06F 3/0619
                                                  713/310

* cited by examiner

510

MRX_W | SFD | CMD | BL | INDX | W_ADDR | BE0 | W_DATA0 | BE1 | W_DATA1

MTX_W | SFD | CMD | N/A | INDX

MRX_R | SFD | CMD | BL | INDX | R_ADDR

MTX_R | SFD | CMD | BL | INDX | R_DATA0 | R_DATA

CIRCUIT STRUCTURE SHARING THE SAME MEMORY AND DIGITAL VIDEO TRANSFORMING DEVICE

CROSS-REFERENCE TO RELATED APPLICATION

This application claims the priority benefit of China application serial no. 201710362469.3, filed on May 22, 2017. The entirety of the above-mentioned patent application is hereby incorporated by reference herein and made a part of this specification.

BACKGROUND

Technical Field

The present invention relates to an electronic circuit, and more particularly, to a circuit structure sharing the same memory and a digital video transforming device.

Description of Related Art

In response to the communication needs of some electronic devices, many electronic devices with communication functions are provided with a plurality of chips, and each of the chips may provide specific signal processing functions such as signal transmission, demodulation, decoding and the like. In addition, input and output data needs to be buffered during the signal processing. Therefore, each chip is usually equipped with a dedicated volatile memory served as a data buffer. However, if each chip is equipped with a dedicated volatile memory, the overall area of the circuit layout is larger, and the cost of the system setup is also higher.

SUMMARY

In view of this, the invention provides a circuit structure sharing the same memory and a digital video transforming device, which improve the using efficiency of the volatile memory.

An embodiment of the invention provides a circuit structure sharing the same memory and the circuit structure includes a first volatile memory, a system chip and a signal processing chip. The system chip is connected to the first volatile memory via a first connection interface. The signal processing chip is connected to the system chip via a second connection interface. The interface specification of the first connection interface is different from the interface specification of the second connection interface. A memory controller for controlling the first volatile memory is disposed in the system chip, and the memory controller is connected to the first connection interface and the second connection interface. The signal processing chip transmits a first access command to the memory controller via the second connection interface, and the memory controller accesses the first volatile memory via the first connection interface according to the first access command and transmits the access result of the first access command to the signal processing chip via the second connection interface during the operation of the signal processing chip.

Another embodiment of the invention provides a digital video transforming device which includes a volatile memory, a system chip and a tuner circuit. The system chip is connected to the volatile memory via a first connection interface. The tuner circuit is connected to the system chip via a second connection interface. The interface specification of the first connection interface is different from the interface specification of the second connection interface. A memory controller for controlling the volatile memory is disposed in the system chip, and the memory controller is connected to the first connection interface and the second connection interface. The tuner circuit transmits a first access command to the memory controller via the second connection interface, and the memory controller accesses the volatile memory via the first connection interface according to the first access command and transmits the access result of the first access command to the tuner circuit via the second connection interface during the operation of the tuner circuit.

In view of above, the invention allows a plurality of chips to share the same volatile memory and transmit related access commands between the plurality of the chips via specific connection interfaces, thereby effectively improving the using efficiency of the volatile memory. In addition, the effect of reducing the layout area of the overall circuit structure and reducing the system setup cost can also be achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5 and FIG. 6 are schematic diagrams of command codes of the first type signal according to an embodiment of the invention.

DESCRIPTION OF THE EMBODIMENTS

Figure 1:
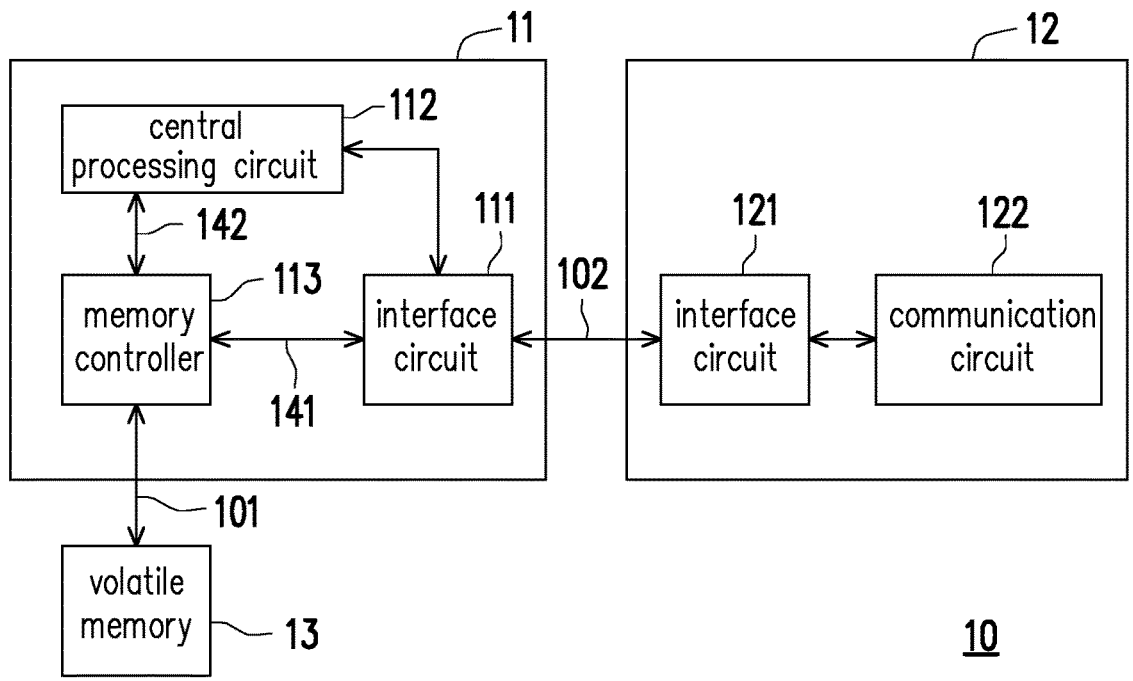
FIG. 1 is a schematic diagram of a circuit structure sharing the same memory according to an embodiment of the invention.

FIG. 1 is a schematic diagram of a circuit structure sharing the same memory according to an embodiment of the invention. Referring to FIG. 1, the circuit structure 10 includes a system chip 11, a signal processing chip 12 and a volatile memory 13. The system chip 11 is a system on chip (SoC). The signal processing chip 12 is one or more independent chip(s) independent from the system chip 11. The operation of the signal processing chip 12 may or may not be controlled by the system chip 11, and the data generated during the operation of the signal processing chip 12 may be temporarily stored in the volatile memory 13 through the system chip 11. The volatile memory (also referred to as a first volatile memory) 13 may be included in the system chip 11 or independently disposed outside the system chip 11, which are not limited in the invention.

In this embodiment, the system chip 11 includes an interface circuit 111, a central processing circuit 112 and a memory controller 113. The memory controller 113 is connected to the interface circuit 111 and the central processing circuit 112. The system chip 11 may perform signal or data transmission with the signal processing chip 12 through the interface circuit 111. The central processing circuit 112 is configured to control the overall operation of the system chip 11 (or the circuit structure 10). The memory controller 113 is configured to control the volatile memory 13. For example, when the volatile memory 13 is going to be accessed, the memory controller 113 may transmit an access command to the volatile memory 13. The volatile memory 13 may execute a corresponding access operation according to this access command, for example, storing data into the volatile memory 13, or reading data from the volatile memory 13.

When the circuit structure 10 sharing the same memory of the invention receives a signal of an external system, the signal processing chip 12 may receive this signal and perform a front-end signal pre-processing. Next, the signal processing chip 12 may transmit the pre-processed signal to the system chip 11, and the signal processing operation for the signal is mainly performed by the system chip 11. In this embodiment, the signal processing chip 12 includes an interface circuit 121 and a communication circuit 122. The communication circuit 122 may perform the above pre-processing operation, and the interface circuit 121 may be used to transmit the pre-processed signal to the system chip 11. In addition to receiving the signal from the external system, the circuit structure 10 sharing the same memory also transmits a signal to the external system by the system chip 11 and the signal processing chip 12. For example, after the system chip 11 completes the signal processing for a signal, this signal is transmitted to the interface circuit 121 by the interface circuit 111 through the connection interface 102. Next, the signal is processed or compiled into an appropriate specification for transmission to the outside by the communication circuit 122. For example, the communication circuit 122 may support digital television standard formats such as Advanced Television Systems Committee standards (ATSC), wireless Digital Video Broadcasting (DVB-T), and Integrated Digital Service Broadcasting (ISDB), or various wireless communication standards such as the third generation of wireless communication technology (3G), bluetooth, General Packet Radio Service (GPRS), High Speed Downlink packet access (HSDPA), High Speed Uplink packet access (HSDPA), Wireless-Fidelity (Wi-Fi), Wireless Wide Area Network (WWAN) and the third Generation Partnership Project Long Term Evolution (3GPP LTE) and the like.

In an embodiment, the circuit structure 10 sharing the same memory may be the signal processing chip system of a set-top box. The system chip 11 may be the main signal processing chip in this signal processing chip system, and the signal processing chip 12 may be a digital front-end chip (such as a demodulator or a tuner) in the signal processing chip system. When the signal processing chip 12 is in operation, the signal processing chip 12 may perform at least one signal processing operation of a signal reception, a frequency conversion, a filtering, an automatic gain control and a demodulation (for example, converting analog signal to digital signal). While the system chip 11 is in operation, the system chip 11 may at least perform a signal decoding operation. For example, after the communication circuit 122 receives the wireless signal from the outside, the communication circuit 122 may perform the above signal processing operations on this signal. According to the execution result of the communication circuit 122, the central processing circuit 112 may continue to execute a signal decoding operation on this signal to generate corresponding input data. In addition, in an embodiment, some or all of the above signal decoding operations may also be executed by the signal processing chip 12 (for example, the communication circuit 122).

In the above embodiment, the signal processing chip 12 may refer to one or more tuner circuits or chips, one or more demodulator circuits or chips or one or more composite circuits or chips including a tuner and a demodulator. In an embodiment, the signal processing chip 12 may also be any communication chip that provides (wired/wireless) communication functions. In addition, in another embodiment which is not mentioned, the signal processing chip 12 may further be other types of chips (e.g., a display chip) and may perform other signal processing operations which are not mentioned (e.g., an image processing operation and the like), which are not limited in the invention. For example, in an embodiment wherein the signal processing chip 12 is a display chip, the communication circuit 122 may be replaced with an image processing circuit with an image processing function, and the image processing circuit may access the volatile memory 13 via the system chip 11.

In this embodiment, the volatile memory 13 may include a dynamic random access memory (DRAM) and/or a static random access memory (SRAM). For example, the volatile memory 13 may include first to fourth generation double data rate (DDR) synchronous dynamic random access memory (DDR, DDR2, DDR3, DDR4 for short) or other types of random access memory. In addition, the number of the volatile memory 13 may be one or more.

In this embodiment, the system chip 11 is connected to the volatile memory 13 via a connection interface (also referred to as a first connection interface) 101, and is connected to the signal processing chip 12 via a connection interface (also referred to as a second connection interface) 102. That is, the connection interface 101 is configured to connect the memory controller 113 and the volatile memory 13, and the connection interface 102 is configured to connect the interface circuits 111 and 121. In addition, the interface specification of the connection interface 101 is different from the interface specification of the connection interface 102. For example, the total number of the pins of the connection interface 101 is different from the total number of the pins of the connection interface 102, the configuration of the pins of the connection interface 101 is different from the configuration of the pins of the connection interface 102, and/or the connection interface standard employed by the connection interface 101 is different from the connection interface standard employed by the connection interface 102. The first connection interface may employ an interface standard which supports the volatile memory 13. The second connection interface may, for example, be a Reduced Gigabit Media Independent Interface (RGMII).

During the operation of the signal processing chip 12 (e.g., performing the above demodulation operation), memory space is required to buffer intermediate results of the digital signal processing, or it is required to read the data already stored in the memory space. At this time, the signal processing chip 12 may transmit an access command (also referred to as a first access command) to the memory controller 113 via the connection interface 102 to request buffering of the intermediate results in the volatile memory 13 or to read data from the volatile memory 13. The memory controller 113 may access the volatile memory 13 via the connection interface 101 according to the first access command and transmit the access result of the first access command to the signal processing chip 12 via the connection interface 102. Taking the need to buffer the intermediate results in the volatile memory 13 as an example, the first access command may be a write command requesting to buffer the intermediate results of the operation of the signal processing chip 12 in the volatile memory 13. Taking the need to read data from the volatile memory 13 as an example, the first access command may be a read command requesting to read data (e.g., the intermediate result) from the volatile memory 13. In addition, when the first access command is a write command, the access result of the first access command may include a response message. This response message reflects whether or not the write operation performed on the volatile memory 13 according to the first access command is completed. If the first access command is a read command, the access result of the first access command may include the data read from the volatile memory 13 according to the first access command. Thereby, the signal processing chip 12 may complete the access to the volatile memory 13.

In addition to the data accessing on the volatile memory 13 by the signal processing chip 12, the system chip 11 may also access the volatile memory 13. For example, during the operation of the central processing circuit 112, the central processing circuit 112 may also transmit an access command (also referred to as a second access command) to the memory controller 113. The memory controller 113 may access the volatile memory 13 via the connection interface 101 according to the second access command and transmit the access result of the second access command to the central processing circuit 112. For example, if the second access command is a write command requesting to store data into the volatile memory 13, the access result of the second access command may include a response message. This response message reflects whether or not the write operation performed on the volatile memory 13 according to the second access command is completed. Alternatively, if the second access command is a read command requesting to read data from the volatile memory 13, the access result of the second access command may include the data read from the volatile memory 13 according to the second access command. In other words, according to the first access command from the signal processing chip 12 or the second access command from the central processing circuit 112, the memory controller 113 may perform the corresponding access operation on the volatile memory 13 and return the access result.

In an embodiment, the access result of the first access command and the access result of the second access command are transmitted via different signal paths in the system chip 11. For example, the access result of the first access command is transmitted to the interface circuit 111 via a signal path (also referred to as a first signal path) 141, and then transmitted to the signal processing circuit 12; the access result of the second access command is transmitted to the central processing circuit 112 via a signal path (also referred to as a second signal path) 142. Alternatively, from another perspective, it may be regarded as that the access result of the second access command will not be transmitted to the interface circuit 111.

Figure 2:
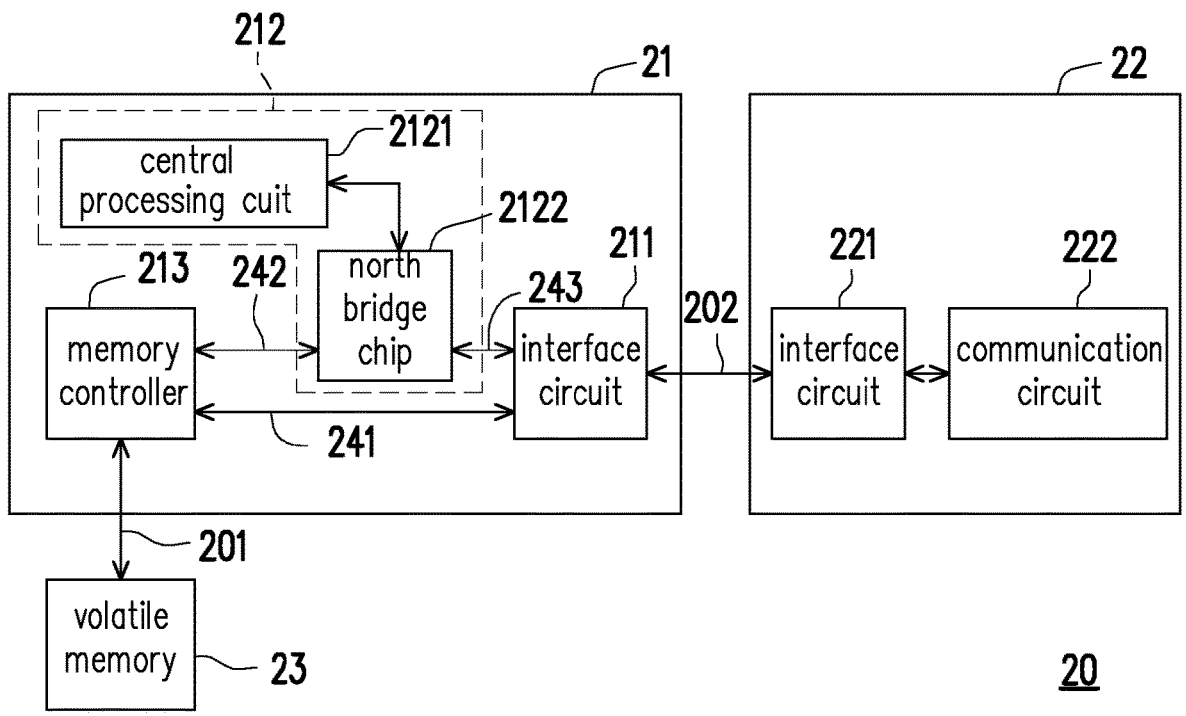
FIG. 2 is a schematic diagram of a circuit structure sharing the same memory according to another embodiment of the invention.

FIG. 2 is a schematic diagram of a circuit structure sharing the same memory according to another embodiment of the invention. Referring to FIG. 2, the circuit structure 20 includes a system chip 21, a signal processing chip 22 and a volatile memory 23. The system chip 21 includes an interface circuit 211, a central processing circuit 212 and a memory controller 213. The signal processing chip 22 includes an interface circuit 221 and a communication circuit 222. It should be noted that the system chip 21, the signal processing chip 22, the volatile memory 23, the interface circuit 211, the central processing circuit 212, the memory controller 213, the interface circuit 221 and the communication circuit 222 are respectively the same as or similar to the system chip 11, the signal processing chip 12, the volatile memory 13, the interface circuit 111, the central processing circuit 112, the memory controller 113, the interface circuit 121 and the communication circuit 122 in the embodiment of FIG. 1, and are not repeated herein. In addition, the connection interfaces 201 and 202 are also respectively the same as or similar to the connection interfaces 101 and 102 in the embodiment of FIG. 1, and are not repeated herein.

In this embodiment, the central processing circuit 212 includes a central processing unit (CPU) 2121 and a north bridge chip 2122. The north bridge chip 2122 is connected to the central processing unit 2121, the interface circuit 211 and the memory controller 213. It should be noted that in another embodiment, both of the central processing unit 2121 and the north bridge chip 2122 may be replaced with other types of circuit modules, such as other types of programmable microprocessors for a general use or a special use, a digital signal processor (DSP), a controller, an application specific integrated circuit (ASIC), a programmable logic device (PLD) or other similar device or combinations of these devices.

When the signal processing chip 22 (or the communication circuit 222) accesses the volatile memory 23, the first access command and the access result of the first access command are transmitted between the memory controller 213 and the interface circuit 211 via the signal path 241. It should be noted that the north bridge chip 2122 is not located on the signal path 241. That is, the first access command and the access result of the first access command are not transmitted via the north bridge chip 2122.

When the central processing unit 2121 accesses the volatile memory 23, the second access command and the access result of the second access command are transmitted between the memory controller 213 and the central processing unit 2121 via the north bridge chip 2122 and the signal path 242. The second access command and the access result of the second access command are not transmitted via the signal path 241. In addition, the central processing unit 2121 may also communicate with the signal processing chip 22 via the north bridge chip 2122 and the signal path 243 (e.g., transmitting a control command to the communication circuit 222 or receiving data from the communication circuit 222). Here, the signal path 243 is connected to the north bridge chip 2122 and the interface circuit 211.

Figure 3:
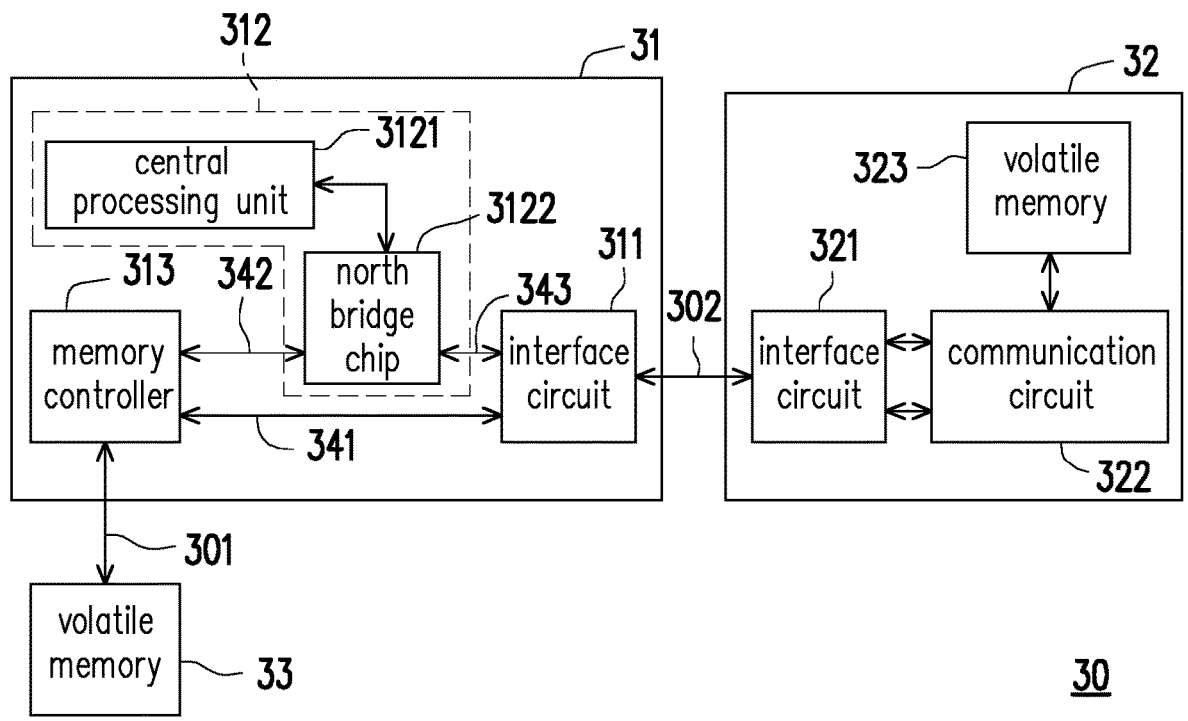
FIG. 3 is a schematic diagram of a circuit structure sharing the same memory according to another embodiment of the invention.

FIG. 3 is a schematic diagram of a circuit structure sharing the same memory according to another embodiment of the invention. Referring to FIG. 3, the circuit structure 30 includes a system chip 31, a signal processing chip 32 and a volatile memory 33. The system chip 31 includes an interface circuit 311, a central processing circuit 312 and a memory controller 313. The central processing circuit 312 includes a central processing unit 3121 and a north bridge chip 3122. The signal processing chip 32 includes an interface circuit 321 and a communication circuit 322. It should be noted that the system chip 31, the signal processing chip 32, the volatile memory 33, the interface circuit 311, the central processing circuit 312, the central processing unit 3121, the north bridge chip 3122, the memory controller 313, the interface circuit 321 and the communication circuit 322 are respectively the same as or similar to the system chip 21, the signal processing chip 22, the volatile memory 23, the interface circuit 211, the central processing circuit 212, the central processing unit 2121, the north bridge chip 2122, the memory controller 213, the interface circuit 221 and the communication circuit 222 in the embodiment of FIG. 2, and are not repeated herein. In addition, the connection interfaces 301 and 302 are also respectively the same as or similar to the connection interfaces 201 and 202 in the embodiment of FIG. 2, and are not repeated herein.

In FIG. 2, the signal processing chip 22 is not configured with a volatile memory, so the signal processing chip 22 only uses the volatile memory 23 as a memory. However, in this embodiment, a volatile memory (also referred to as a second volatile memory) 323 is further disposed in the signal processing chip 32. The volatile memory 323 is connected to the communication circuit 322 and the interface circuit 321. The type of the volatile memory 323 may be the same as or different from the type of the volatile memory 33. In this embodiment, the layout area (or capacity) of the volatile memory 323 is smaller than the layout area (or capacity) of the volatile memory 33. It should be particularly noted that when the circuit structure 30 sharing the same memory is the signal processing chip system of a set-top box, the design and complexity of the main system chip (i.e., the system chip 31) are usually higher than those of a demodulator or a tuner circuit (e.g., the signal processing chip 32). The capacity and performance of memory (e.g., the volatile memory 33) configured for the main system chip are also usually higher than those of memory (e.g., the volatile memory 323) configured for the demodulator or the tuner circuit. In this embodiment, the demodulator or the tuner circuit may directly be configured with and use the volatile memory 323 to meet the needs and applications of short time-delay. With respect to the needs and applications not sensitive to the time-delay, the memory with a large capacity configured for the main system chip may be used. The main feature of the invention is to share the rest storage space in the volatile memory 33 configured for the system chip 31 to the signal processing chip 32 with respect to the application not sensitive to time-delay, so that the system cost may be reduced. However, in another embodiment, the layout area (or capacity) of the volatile memory 323 may also be irrelevant to the layout area (or capacity) of the volatile memory 33, depending on the actual needs. In addition, the number of the volatile memory 323 may also be one or more.

In this embodiment, the communication circuit 322 may access the volatile memories 323 and 33. For example, in an embodiment, the communication circuit 322 may regard the volatile memory 323 as the main memory of the communication circuit 322, and when running out of the volatile memory 323 (e.g., the volatile memory 323 is full), the communication circuit 322 may continue to use the volatile memory 33. In addition, the communication circuit 322 may also use the volatile memories 323 and 33 according to the type of data to be stored or other rules, which are not limited in the invention. For example, in an embodiment, if the current data to be stored belongs to one preset type, this data may be stored in the volatile memory 323; if the current data to be stored belongs to another preset type, this data may be stored in the volatile memory 33. Here, different preset types of data may have different frequencies of use or importance, which are not limited in the invention. In this embodiment, the system chip 31 may also access the volatile memories 323 and 33. For example, the communication circuit 322 may store the processed or unprocessed data in the volatile memory 323, and the system chip 31 may instruct reading data from the volatile memory 323 or storing data into the volatile memory 323.

In this embodiment, the signal processing chip 32 accesses the volatile memory 33 via a specific signal (also referred to as a first type signal) transmitted on the connection interface 302, and the system chip 31 accesses the volatile memory 323 via another specific signal (also referred to as a second type signal) transmitted on the connection interface 302. Here, the signal format of the first type signal is different from the signal format of the second type signal. Here, the signal format of the first type signal being different from the signal format of the second type signal may refer to that the pulse widths, the voltage levels, the pulse patterns and/or the formats of the transmitted command codes of the first type signal and the second type signal are different. In addition, the first type signal and the second type signal may be transmitted via the same or different pins of the connection interface 302, which are not limited in the invention.

Figure 4:
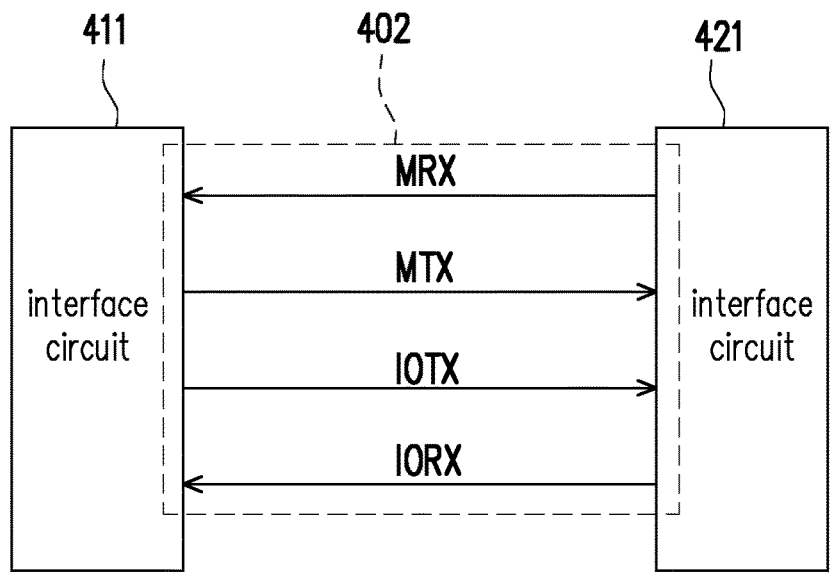
FIG. 4 is a schematic diagram of transmissions of a first type signal and a second type signal according to an embodiment of the invention.

FIG. 4 is a schematic diagram of transmissions of a first type signal and a second type signal according to an embodiment of the invention. Referring to FIG. 4, the connection interface 402, the interface circuit 411 and the interface circuit 421 are respectively the same as or similar to the connection interface 302, the interface circuit 311 and the interface circuit 321 in the embodiment of FIG. 3.

In this embodiment, the first type signal includes signals MRX and MTX, and the second type signal includes signals IOTX and IORX. The signals MRX and IORX are transmitted from the interface circuit 421 (e.g., the signal processing chip 32 of FIG. 3) to the interface circuit 411 (e.g., the system chip 31 of FIG. 3) via the connection interface 402. The signals MTX and IOTX are transmitted from the interface circuit 411 to the interface circuit 421 via the connection interface 402. In addition, the signals MRX, MTX, IOTX and IORX may be transmitted via one or more pins in the connection interface 402.

Referring to both FIG. 3 and FIG. 4, when the signal processing chip 32 accesses the volatile memory 33, the signal MRX may be generated and transmitted to the interface circuit 311. After receiving the signal MRX, the signal MRX may be transmitted to the memory controller 313 via the signal path 341, and the memory controller 313 may access the volatile memory 33 according to the access command carried by the signal MRX. Then, the memory controller 313 may transmit the signal MTX carrying the corresponding access result to the interface circuit 321 via the signal path 341, and thereby the signal processing chip 32 completes the access to the volatile memory 33.

On the other hand, when the system chip 31 accesses the volatile memory 323, the signal IOTX may be generated and transmitted to the interface circuit 321. After receiving the signal IOTX, the memory controller (not shown) in the communication circuit 322 may access the volatile memory 323 according to the access command carried by the signal IOTX. Then, the signal IORX carrying the corresponding access result may be generated and transmitted to the interface circuit 311. After the interface circuit 311 receives the signal IORX, the signal IORX may be transmitted to the central processing unit 3121 via the signal path 343 and the north bridge chip 3122, and thereby the system chip 31 (or the central processing unit 3121) completes the access to the volatile memory 323. In addition, the system chip 31 may also instruct the memory controller 313 to access the volatile memory 33 via the signal path 342, that is not repeated herein.

FIG. 5 and FIG. 6 are schematic diagrams of command codes of the first type signal according to an embodiment of the invention. Referring to FIG. 3, FIG. 4 and FIG. 5, the signal MRX includes the signal MRX_W, and the signal MTX includes the signal MTX_W. The signals MRX_W and MTX_W are respectively used to transmit command codes 510 and 520. The command code 510 is used to instruct to write data to the volatile memory 33, and the command code 520 is provided with a response message about whether the data has been written to the volatile memory 33. For example, the command code 510 includes a plurality of fields that respectively record the certification code SFD, the command CMD, the bit length BL, the index INDX, the write address W_ADDR, the bit indicator BE0, the write data W_DATA0, the bit indicator BE1 and the write data W_DATA1 and the like. In addition, the command code 520 also includes a plurality of fields that respectively record the certification code SFD, the command CMD and the index INDX.

Referring to FIG. 3, FIG. 4 and FIG. 6, the signal MRX further includes a signal MRX_R, and the signal MTX further includes a signal MTX_R. The signals MRX_R and MTX_R are respectively used to transmit command codes 610 and 620. The command code 610 is used to instruct to read data from the volatile memory 33, and the command code 620 carries the data read from the volatile memory 33. For example, the command code 610 includes a plurality of fields that respectively record the certification code SFD, the command CMD, the bit length BL, the index INDX and the read address R_ADDR. In addition, the command code 620 also includes a plurality of fields that respectively record the certification code SFD, the command CMD, the bit length BL, the index INDX and the read data R_DATA.

Figure 7:
FIG. 7 and FIG. 8 are schematic diagrams of command codes of the second type signal according to an embodiment of the invention.
Figure 7:
Figure 8:
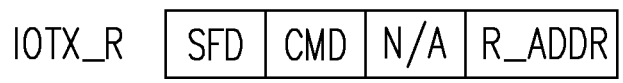
Figure 8:

FIG. 7 and FIG. 8 are schematic diagrams of command codes of the second type signal according to an embodiment of the invention. Referring to FIG. 3, FIG. 4 and FIG. 7, the signal IOTX includes a signal IOTX_W, and the signal IORX includes a signal IORX_W. The signals IOTX_W and IORX_W are respectively used to transmit command codes 710 and 720. The command code 710 is used to instruct to write data to the volatile memory 323, and the command code 720 is provided with a response message about whether the data has been written to the volatile memory 323. For example, the command code 710 includes a plurality of fields that respectively record the certification code SFD, the command CMD, the bit enable BE, the write address W_ADDR and the write data W_DATA. In addition, the command code 720 also includes a plurality of fields that respectively record the certification code SFD and the command CMD.

Referring to FIG. 3, FIG. 4 and FIG. 8, the signal IOTX further includes a signal IOTX_R, and the signal IORX further includes a signal IORX_R. The signals IOTX_R and IORX_R are respectively used to transmit command codes 810 and 820. The command code 810 is used to instruct to read data from the volatile memory 323, and the command code 820 carries the data read from the volatile memory 323. For example, the command code 810 includes a plurality of fields that respectively record the certification code SFD, the command CMD and the read address R_ADDR. In addition, the command code 820 also includes a plurality of fields that respectively record the certification code SFD, the command CMD and the read data R_DATA. It should be noted that the command codes illustrated in FIG. 5 to FIG. 8 are examples. In other embodiments which are not mentioned, the command codes (or the access commands) transmitted by the first type signal and the second type signal may also have other formats, which are not limited in the invention.

Referring back to FIG. 1, in an embodiment, in the initialization phase, at least one of the system chip 11 and the signal processing chip 12 may perform a clock correction operation for synchronizing the clocks of the system chip 11 and the signal processing chip 12. For example, in this initialization phase, the system chip 11 and/or the signal processing chip 12 may correct the system clock by this clock correction operation, for example, by adjusting the frequency and/or the phase of the system clock. After the clock correction operation is completed, the clocks of the system chip 11 and the signal processing chip 12 may be synchronized, so as to reduce errors that may be generated when the system chip 11 and the signal processing chip 12 subsequently use their respective system clock to analyze signals. In other words, this clock correction operation may reduce data access errors or data transmit errors that may be generated due to inconsistent analysis of signals between the system chip 11 and the signal processing chip 12.

It should be noted that in an embodiment, this initialization phase may not exist, or only be performed during the setup phase (before outgoing from factory) of the circuit structure 10, which are not limited in the invention. In addition, in an embodiment, the initialization phase may also be (regularly) performed in accordance with a predetermined maintenance rule after the normal operations of the system chip 11 and the signal processing chip 12 start (after outgoing from factory). For example, whenever the circuit structure 10 (i.e., the system chip 11, the signal processing chip 12 and the volatile memory 13) is powered on, it may automatically enter this initialization phase to perform the clock correction operation.

In an embodiment, the signal processing chip 12 perform this clock correction operation by the first type signal transmitted on the connection interface 102. For example, in the initialization phase, the signal processing chip 12 may transmit the command code carrying specific data to the system chip 11 by the first type signal. The system chip 11 may analyzes the first type signal received to obtain this specific data and return a command code carrying certification data to the signal processing chip 12 by the first type signal. The signal processing chip 12 may compare this specific data with the certification data from the system chip 11. For example, compared to the specific data originally transmitted, the result of this comparison may show that there are several error bits in the certification data.

In an embodiment, the signal processing chip 12 may correct the system clock of the signal processing chip 12 according to the result of the comparison. Alternatively, in another embodiment, the signal processing chip 12 may also transmit the result of the comparison or the clock adjustment parameter generated according to the result of the comparison to the system chip 11, and the system chip 11 may adjust the system clock of the system chip 11 according to the result of the comparison from the signal processing chip 12.

In another embodiment, the system chip 11 may also perform this clock correction operation by the second type signal transmitted on the connection interface 102. For example, in the initialization phase, the system chip 11 may transmit the command code carrying specific data to the signal processing chip 12 by the second type signal, and the signal processing chip 12 may return a command code carrying the corresponding certification data by the second type signal. According to the difference between the specific data and the certification data, the system chip 11 may adjust the system clock of the system chip 11 or instruct the signal processing chip 12 to adjust the system clock of the signal processing chip 12.

In an embodiment, if the result of the comparison shows that the specific data is the same as the certification data (or the number of error bits between the specific data and the certification data is smaller than a preset number), the system chip 11 or the signal processing chip 12 may determine that the system clock at both ends has reached the same and complete the clock correction operation. On the contrary, if the result of the comparison shows that the specific data is different from the certification data (or the number of different bits between the specific data and the certification data is larger than a preset number), the system chip 11 or the signal processing chip 12 may repeat the clock correction operation until the system clocks of the signal processing chip 12 and the system chip 11 reach consistency.

In an embodiment, the clock correction operation is performed by the interface circuit 111 and/or the interface circuit 121. However, in another embodiment, the clock correction operation is performed by the central processing circuit 112 and/or the communication circuit 122. It should be noted that although the clock correction operation is described by taking the circuit structure 10 in the embodiment of FIG. 1 as an example, the same or similar clock correction operation may also be applied to the circuit structures 20 and 30 in the embodiments of FIG. 2 and FIG. 3, which are not repeated herein.

Figure 9:
FIG. 9 and FIG. 10 are schematic diagrams of command codes for clock synchronization according to an embodiment of the invention.
Figure 10:
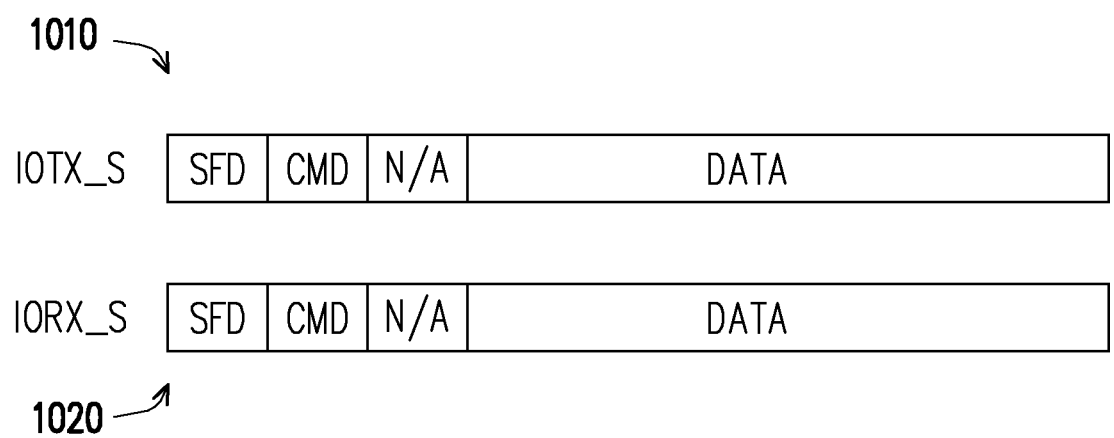

FIG. 9 and FIG. 10 are schematic diagrams of command codes for clock synchronization according to an embodiment of the invention. Referring to FIG. 4 and FIG. 9, in an embodiment, the signal MRX further includes a signal MRX_S, and the signal MTX further includes a signal MTX_S. The signals MRX_S and MTX_S are respectively used to transmit command codes 910 and 920. The command code 910 carries the specific data DATA, and the command code 920 carries the certification data DATA. According to the result of the comparison between the specific data DATA in the command code 910 and the certification data DATA in the command code 920, the interface circuit 421 may adjust its own system clock or instruct the interface circuit 411 to adjust the system clock.

Referring to FIG. 4 and FIG. 10, in an embodiment, the signal IOTX further includes a signal IOTX_S, and the signal IORX further includes a signal IORX_S. The signals IOTX_S and IORX_S are respectively used to transmit command codes 1010 and 1020. The command code 1010 carries the specific data DATA, and the command code 1020 carries the certification data DATA. According to the result of the comparison between the specific data DATA in the command code 1010 and the certification data DATA in the command code 1020, the interface circuit 411 may adjust its own system clock or instruct the interface circuit 421 to adjust the system clock.

It should be noted that the electronic circuit elements and the circuit layouts shown in FIG. 1, FIG. 2 and FIG. 3 are all examples. In other embodiments which are not mentioned, some of the electronic circuit elements shown in FIG. 1, FIG. 2 and FIG. 3 may also be replaced with other electronic circuit elements with the same or similar functions, and some of the circuit layouts may also be adjusted to meet practical requirements. In addition, more electronic circuit elements may also be added to the circuit structure 10, 20 or 30 shown in FIG. 1, FIG. 2 and FIG. 3 to provide additional functions.

In some embodiments of FIG. 1, FIG. 2 and FIG. 3, the circuit structure 10, 20 or 30 is disposed or configured in the digital video transforming device. For example, the digital video transforming device may include a set-top box, a television or a similar media playback device. In addition, in the rest of the embodiments of FIG. 1, FIG. 2 and FIG. 3, the circuit structure 10, 20 or 30 may also be configured in other types of signal processing devices (e.g., a personal computer, a table or a smartphone), not limited to the digital video transforming device.

Figure 11:
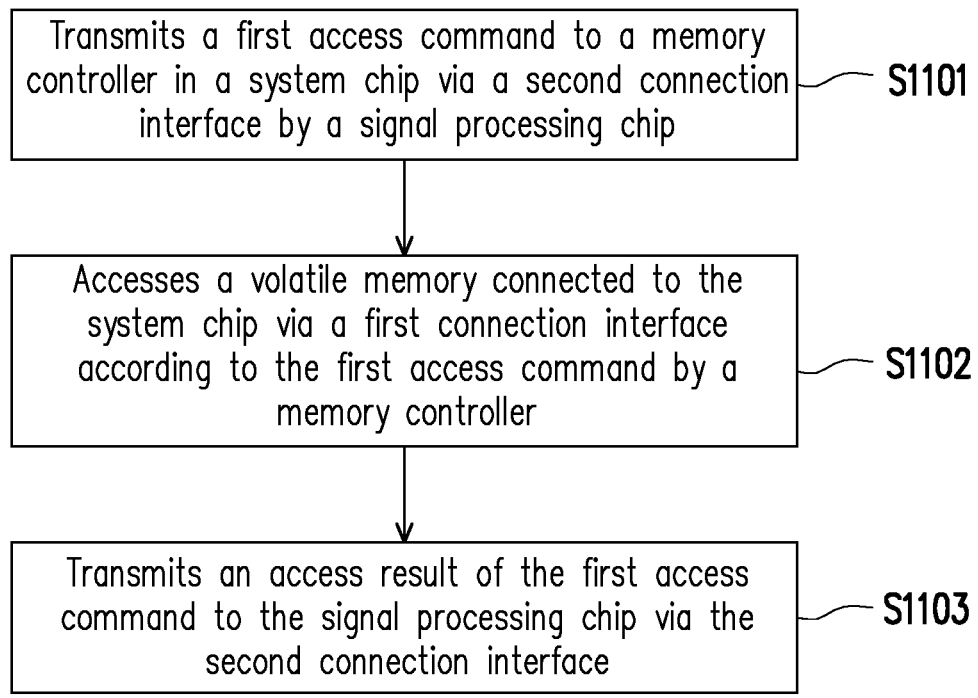
FIG. 11 is a flowchart of a memory access method according to an embodiment of the invention.

FIG. 11 is a flowchart of a method of sharing the same memory according to an embodiment of the invention. Referring to FIG. 11, in Step S1101, the signal processing chip transmits the first access command to the memory controller in the system chip via the second connection interface. In Step S1102, the memory controller accesses the volatile memory connected to the system chip via the first connection interface according to the first access command. In Step S1103, the access result of the first access command is transmitted to the signal processing chip via the second connection interface.

However, each step in FIG. 11 is described in detail above, and the details are not repeated herein. It should be noted that each step in FIG. 11 may be implemented as a plurality of program codes or circuits, which is not limited in the invention. In addition, the method in FIG. 11 may be used in combination with at least some of the above embodiments, and may also be used independently, which are not limited in the invention.

In summary, the invention allows a plurality of chips (or a chip and a circuit) to share the same volatile memory and transmit related access commands and access data between the plurality of chips (or the chip and the circuit) via specific connection interfaces, thereby effectively improving the using efficiency of the volatile memory. In addition, the effect of reducing the layout area of the overall circuit structure and reducing the system setup cost can also be achieved by the invention. In addition, by executing the clock correction operation between the plurality of chips (or the chip and the circuit), the invention may synchronize the system clocks of the plurality of chips (or the chip and the circuit) and reduce the subsequent data access error.

Although the disclosure has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A circuit structure sharing the same memory, including:
    a first volatile memory;
    a system chip, connected to the first volatile memory via a first connection interface; and
    a signal processing chip, connected to the system chip via a second connection interface and configured to generate a digital signal by performing at least one of signal processing operations including a frequency conversion, a filtering, an automatic gain control and a demodulation,
    wherein when the signal processing chip transmits the digital signal to the system chip through the second connection interface, the system chip performs a signal decoding operation on the digital signal, wherein an interface specification of the first connection interface is different from an interface specification of the second connection interface, wherein a memory controller for controlling the first volatile memory is disposed in the system chip, and the memory controller is connected to the first connection interface and the second connection interface, wherein the signal processing chip transmits a first access command to the memory controller via the second connection interface when the signal processing chip is operated, and the memory controller accesses the first volatile memory via the first connection interface according to the first access command and transmits an access result of the first access command to the signal processing chip via the second connection interface.

2. The circuit structure sharing the same memory according to claim 1, wherein a central processing circuit is further disposed in the system chip and the central processing circuit is connected to the memory controller, the central processing circuit transmits a second access command to the memory controller when the central processing circuit is operated, and the memory controller accesses the first volatile memory via the first connection interface according to the second access command and transmits an access result of the second access command to the central processing circuit.

3. The circuit structure sharing the same memory according to claim 2, wherein the first access command and the access result of the first access command are transmitted via a first signal path within the system chip, the second access command and the access result of the second access command are transmitted via a second signal path within the system chip, and the first signal path is different from the second signal path.

4. The circuit structure sharing the same memory according to claim 1, wherein a second volatile memory is disposed in the signal processing chip, and the system chip further accesses the second volatile memory via the second connection interface.

5. The circuit structure sharing the same memory according to claim 4, wherein the signal processing chip accesses the first volatile memory by a first type signal of the second connection interface, the system chip accesses the second volatile memory by a second type signal of the second connection interface, and a signal format of the first type signal is different from a signal format of the second type signal.

6. The circuit structure sharing the same memory according to claim 4, wherein a layout area of the second volatile memory is smaller than a layout area of the first volatile memory.

7. The circuit structure sharing the same memory according to claim 1, wherein the signal processing chip comprises a communication circuit, and the system chip transmits an output signal or receives an input signal via the communication circuit.

8. The circuit structure sharing the same memory according to claim 1, wherein at least one of the system chip and the signal processing chip performs a clock correction operation for synchronizing the clocks of the system chip and the signal processing chip in an initialization phase.

9. A digital video transforming device, comprising:

a volatile memory;

a system chip, connected to the volatile memory via a first connection interface; and a tuner circuit, connected to the system chip via a second connection interface and configured to generate a digital signal by performing at least one of signal processing operations including a frequency conversion, a filtering, an automatic gain control and a demodulation, wherein when the tuner circuit transmits the digital signal to the system chip through the second connection interface, the system chip performs a signal decoding operation on the digital signal, wherein an interface specification of the first connection interface is different from an interface specification of the second connection interface, wherein a memory controller for controlling the volatile memory is disposed in the system chip, and the memory controller is connected to the first connection interface and the second connection interface, wherein the tuner circuit transmits a first access command to the memory controller via the second connection interface when the tuner circuit is operated, and the memory controller accesses the volatile memory via the first connection interface according to the first access command and transmits an access result of the first access command to the tuner circuit via the second connection interface.

10. The digital video transforming device according to claim 9, wherein a central processing circuit is further disposed in the system chip and the central processing circuit is connected to the memory controller, wherein the central processing circuit transmits a second access command to the memory controller when the central processing circuit is operated, and the memory controller accesses the volatile memory via the first connection interface according to the second access command and transmits an access result of the second access command to the central processing circuit.

11. The digital video transforming device according to claim 10, wherein the first access command and the access result of the first access command are transmitted via a first signal path within the system chip, the second access command and the access result of the second access command are transmitted via a second signal path within the system chip, and the first signal path is different from the second signal path.

12. The digital video transforming device according to claim 9, wherein the tuner circuit comprises a communication circuit, and the system chip transmits an output signal or receives an input signal via the communication circuit.

* * * * *